United States Patent
Chiba

(10) Patent No.: US 9,042,140 B2
(45) Date of Patent: May 26, 2015

(54) BRIDGE-LESS STEP-UP SWITCHING POWER SUPPLY DEVICE

(71) Applicant: Sanken Electric Co., Ltd., Niiza-shi, Saitama (JP)

(72) Inventor: Akiteru Chiba, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 91 days.

(21) Appl. No.: 14/019,624

(22) Filed: Sep. 6, 2013

(65) Prior Publication Data

US 2014/0071724 A1 Mar. 13, 2014

(30) Foreign Application Priority Data

Sep. 10, 2012 (JP) ................. 2012-198058

(51) Int. Cl.
*H02M 1/42* (2007.01)
*H02M 7/217* (2006.01)
*H02M 1/00* (2006.01)

(52) U.S. Cl.
CPC ............ *H02M 1/4208* (2013.01); *H02M 7/217* (2013.01); *Y02B 70/126* (2013.01); *H02M 7/2173* (2013.01); *H02M 2001/0064* (2013.01); *H02M 2001/4291* (2013.01)

(58) Field of Classification Search
CPC .................................................... Y02E 40/30
USPC ............................. 363/89, 127; 323/205, 207
See application file for complete search history.

(56) References Cited

U.S. PATENT DOCUMENTS

| 7,518,895 | B2* | 4/2009 | Shekhawat et al. | 363/89 |
| 2008/0316775 | A1* | 12/2008 | Tsai et al. | 363/21.01 |
| 2011/0037444 | A1* | 2/2011 | Wildash | 323/210 |
| 2011/0260700 | A1* | 10/2011 | Chen et al. | 323/207 |
| 2012/0092910 | A1* | 4/2012 | Sugahara et al. | 363/84 |
| 2013/0003427 | A1* | 1/2013 | Pan | 363/44 |
| 2013/0077365 | A1* | 3/2013 | Chalermboon et al. | 363/89 |
| 2013/0257392 | A1* | 10/2013 | Yan et al. | 323/210 |

FOREIGN PATENT DOCUMENTS

JP   H7-115774 A   5/1995

* cited by examiner

*Primary Examiner* — Gary L Laxton
(74) *Attorney, Agent, or Firm* — Marvin A. Motsenbocker; Mots Law, PLLC

(57) ABSTRACT

A bridge-less step-up switching power supply device includes (i) a first and a second reactor having: a first and a second main winding connected to a first and a second input terminal, respectively; and a first and a second auxiliary winding magnetically coupled to the first main winding and connected to the first and second main windings, the first and second auxiliary windings having a first and a second leakage inductance, respectively; (ii) a first and a second diode connected between the first and second auxiliary windings and a first output terminal, respectively; (iii) a first capacitor connected between the first output terminal and a second output terminal; (iv) a second capacitor connected between a connection point of a third switch and a fourth switch, and the first output terminal; and (v) a controller for controlling turning on/off of first to fourth switches.

8 Claims, 7 Drawing Sheets

US 9,042,140 B2

BRIDGE-LESS STEP-UP SWITCHING POWER SUPPLY DEVICE

BACKGROUND OF THE INVENTION

The present invention relates to a bridge-less step-up switching power supply devices capable of reducing a switching loss of a switching element.

There is known a bridge-less step-up switching power supply device for improving a power factor without rectifying an AC voltage of an AC power supply. FIG. 1 shows an example of a related-art bridge-less step-up switching power supply device. In FIG. 1, a series circuit of a reactor L11 and a switch Q1 including a MOSFET is connected between one end of an AC power supply Vin and an output voltage (−Vo). A series circuit of a reactor L12 and a switch Q2 including a MOSFET is connected between the other end of the AC power supply Vin and the output voltage (−Vo).

An anode of a diode D1 is connected to a connection point of the reactor L11 and a drain of the switch Q1, and a cathode of the diode D1 is connected to an output voltage (+Vo) and one end of a capacitor C1. An anode of a diode D2 is connected to a connection point of the reactor L12 and a drain of the switch Q2, and a cathode of the diode D2 is connected to the output voltage (+Vo) and one end of the capacitor C1. The other end of the capacitor C1 is connected to the output voltage (−Vo). A load (not-illustrated) is connected between the output voltage (+Vo) and the output voltage (−Vo).

A controller 100 controls the output voltage Vo so as to be a predetermined voltage by simultaneously turning on/off the switch Q1 and the switch Q2 based on a voltage of the capacitor C1.

Such a related-art bridge-less step-up switching power supply device combines rectification and step-up operations of an AC voltage, and can significantly reduce a conduction loss due to a diode bridge in a related-art power supply circuit, and therefore is used as a high-efficient power supply device.

As such a related art, a power supply device described in Japanese Patent Application Laid-Open Publication No. 07-115774 (Patent Literature 1) is known. In this power supply device, two rectification elements, through which a feedback current passes, of a bridge-type full-wave rectifying circuit are replaced with a high speed switch element, respectively, and the high speed switch elements are properly controlled, thereby improving a power factor, reducing the number of components, and improving the conversion efficiency/reliability.

SUMMARY OF THE INVENTION

However, when the related-art bridge-less step-up switching power supply device shown in FIG. 1 performs a switching operation under PWM control, a recovery current is generated in regeneration diodes D1 and D2 due to DC superposition of a current because this switching operation is a hard-switching operation. Therefore, a switching loss occurs at the switches Q1 and Q2, and a high efficiency cannot be achieved.

According to the present invention, a bridge-less step-up switching power supply device capable of reducing the switching loss and achieving a high efficiency can be provided.

According to a technical aspect of the present invention, a bridge-less step-up switching power supply device includes: a first input terminal and a second input terminal connected to an AC power supply; a first output terminal and a second output terminal connected to a load; a first reactor including a first main winding connected to the first input terminal and a first auxiliary winding magnetically coupled to the first main winding and connected to the first main winding, the first auxiliary winding having a first leakage inductance; a second reactor including a second main winding connected to the second input terminal and a second auxiliary winding magnetically coupled to the second main winding and connected to the second main winding, the second auxiliary winding having a second leakage inductance; a first diode connected between the first auxiliary winding of the first reactor and the first output terminal; a second diode connected between the second auxiliary winding of the second reactor and the first output terminal; a first capacitor connected between the first output terminal and the second output terminal; a first switch connected between a connection point of the first main winding and the first auxiliary winding of the first reactor, and the second output terminal; a second switch connected between a connection point of the second main winding and the second auxiliary winding of the second reactor, and the second output terminal; a third switch connected to the connection point of the first main winding and the first auxiliary winding of the first reactor; a fourth switch connected to the connection point of the second main winding and the second auxiliary winding of the second reactor; a second capacitor connected between a connection point of the third switch and the fourth switch, and the first output terminal or the second output terminal; and a controller for controlling the turning on/off of the first switch, the second switch, the third switch, and the fourth switch.

According to another technical aspect of the present invention, a bridge-less step-up switching power supply device includes: a first input terminal and a second input terminal connected to an AC power supply; a second output terminal and a second output terminal connected to a load; a first reactor including a first main winding connected to the first input terminal and a first auxiliary winding magnetically coupled to the first main winding and connected to the first main winding; a second reactor including a second main winding connected to the second input terminal and a second auxiliary winding magnetically coupled to the second main winding and connected to the second main winding; a third reactor connected to the first auxiliary winding of the first reactor; a fourth reactor connected to the second auxiliary winding of the second reactor; a first diode connected between the first auxiliary winding of the first reactor and the first output terminal; a second diode connected between the second auxiliary winding of the second reactor and the first output terminal; a first capacitor connected between the first output terminal and the second output terminal; a first switch connected between a connection point of the first main winding and the first auxiliary winding of the first reactor, and the second output terminal; a second switch connected between a connection point of the second main winding and the second auxiliary winding of the second reactor, and the second output terminal; a third switch connected to the connection point of the first main winding and the first auxiliary winding of the first reactor; a fourth switch connected to the connection point of the second main winding and the second auxiliary winding of the second reactor; a second capacitor connected between a connection point of the third switch and the fourth switch, and the first output terminal or the second output terminal; and a controller for controlling the turning on/off of the first switch, the second switch, the third switch, and the fourth switch.

DESCRIPTION OF THE PREFERRED EMBODIMENTS

Hereinafter, bridge-less step-up switching power supply devices of embodiments of the present invention are described in detail with reference to the accompanying drawings.

First Embodiment

Figure 1:
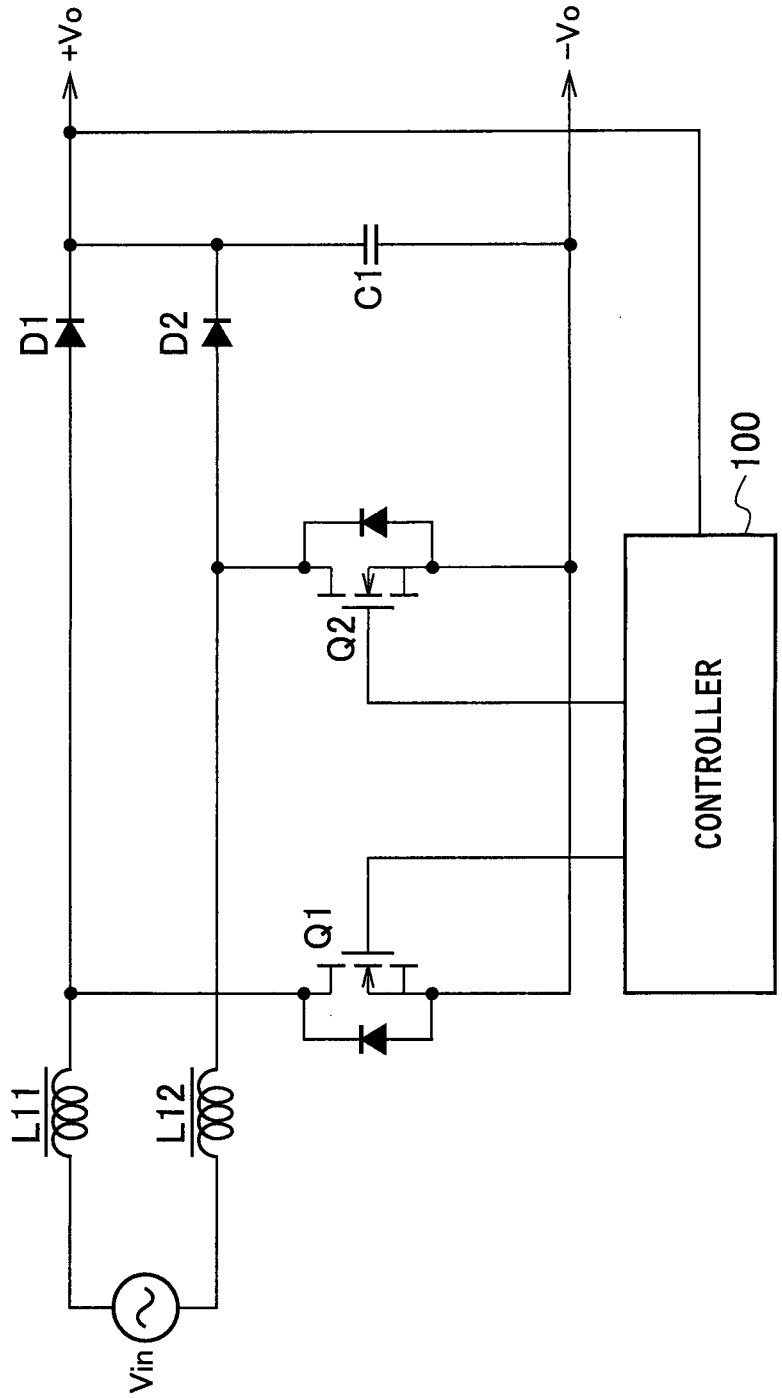
FIG. 1 is a view showing an example of a conventional bridge-less step-up switching power supply device.
Figure 2:
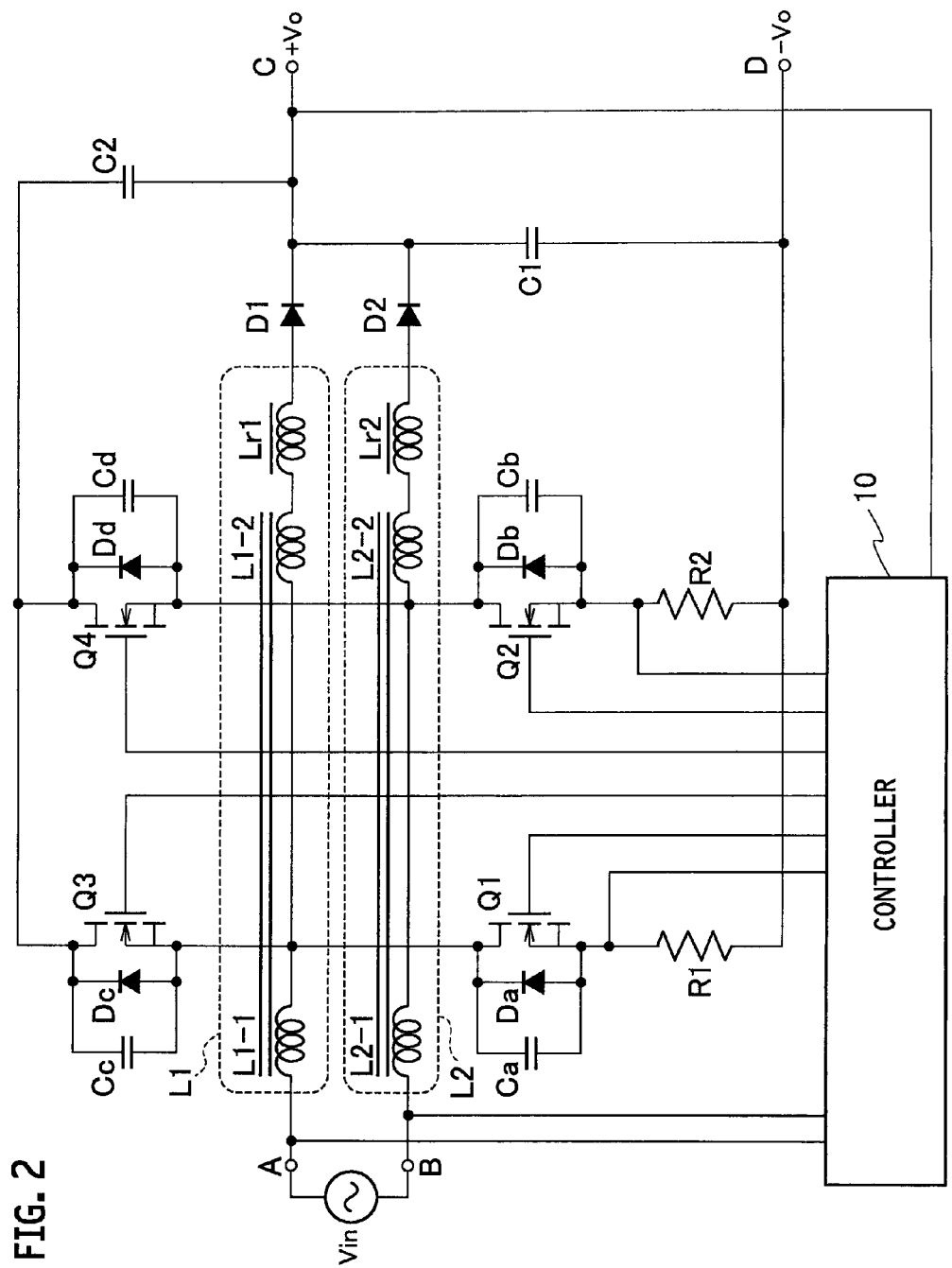
FIG. 2 is a configuration diagram of a bridge-less step-up switching power supply device of Embodiment 1 of the present invention.

FIG. 2 is a configuration diagram of a switching power supply device of Embodiment 1 of the present invention. The switching power supply device of Embodiment 1 illustrated in FIG. 2 is a step-up chopper circuit of a current continuous mode in which currents continuously passing through the reactors L1 and L2.

In FIG. 2, an input terminal A (a first input terminal) and an input terminal B (a second input terminal) are connected to the AC power supply Vin. An output terminal C (a first output terminal, the output voltage +Vo) and an output terminal D (a second output terminal, the output voltage −Vo) are connected to a not-illustrated load.

A reactor L1 (a first reactor) includes a main winding L1-1 (a first main winding) connected to the input terminal A, and an auxiliary winding L1-2 (a first auxiliary winding) magnetically coupled to the main winding L1-1 and connected to the main winding L1-1. The auxiliary winding L1-2 has a leakage inductance Lr1 (a first leakage inductance).

A reactor L2 (a second reactor) includes a main winding L2-1 (a second main winding) connected to the input terminal B, and an auxiliary winding L2-2 (a second auxiliary winding) magnetically coupled to the main winding L2-1 and connected to the main winding L2-1. The auxiliary winding L2-2 has a leakage inductance Lr2 (a second leakage inductance). A diode D1 (a first diode) is connected between the auxiliary winding L1-2 of the reactor L1 and the output terminal C. A diode D2 (a second diode) is connected between the auxiliary winding L2-2 of the reactor L2 and the output terminal C. The capacitor C1 (a first capacitor) is connected between the output terminal C and the output terminal D.

The switch Q1 (a first switch) is connected via a current sensing resistor R1 between the connection point of the main winding L1-1 and the auxiliary winding L1-2 of the reactor L1, and the output terminal D. The switch Q2 (a second switch) is connected via a current sensing resistor R2 between the connection point of the main winding L2-1 and the auxiliary winding L2-2 of the reactor L2, and the output terminal D.

A source of a switch Q3 (a third switch) is connected to the connection point of the main winding L1-2 and the auxiliary winding L1-2 of the reactor L1. A source of a switch Q4 (a fourth switch) is connected to the connection point of the main winding L2-1 and the auxiliary winding L2-2 of the reactor L2. Each of the switches Q1 to Q4 includes an N-type MOSFET.

A capacitor C2 (a second capacitor) is connected between a connection point of a drain of the switch Q3 and a drain of the switch Q4, and the output terminal C.

A controller 10 includes an input voltage polarity detector for detecting a polarity of a voltage between the input terminal A and the input terminal B, and controls a voltage between the output terminal C and the output terminal D so as to be a predetermined value by turning on/off the switches Q1 to Q4 in response to the voltage polarity detected by the input voltage polarity detector.

Based on a voltage from the capacitor C1, voltages from the current sensing resistors R1 and R2, and an AC voltage from the AC power supply Vin at the input terminals A and B, the controller 10 performs control to output the output voltage Vo of a constant voltage higher than an input voltage (a voltage of the AC power supply Vin) by controlling the turning on/off of the switch Q1, the switch Q2, the switch Q3, and the switch Q4. The controller 10 generates gate signals Q1g to Q4g, and turns on/off the switches Q1 to Q4 using the gate signals Q1g to Q4g.

Between the drain and source of the switch Q1, a parallel circuit of a diode Da and a capacitor Ca is connected. The diode Da may be a parasitic diode of the first switch Q1, and the capacitor Ca may be a parasitic capacitor of the switch Q1. Between the drain and source of the switch Q2, a parallel circuit of a diode Db and a capacitor Cb is connected. The diode Db may be a parasitic diode of the switch Q2, and the capacitor Cb may be a parasitic capacitor of the switch Q2.

Between the drain and source of the switch Q3, a parallel circuit of a diode Dc and a capacitor Cc is connected. The diode Dc may be a parasitic diode of the switch Q3, and the capacitor Cc may be a parasitic capacitor of the switch Q3. Between the drain and source of the switch Q4, a parallel circuit of a diode Dd and a capacitor Cd is connected. The diode Dd may be a parasitic diode of the switch Q4, and the capacitor Cd may be a parasitic capacitor of the switch Q4.

Figure 3:
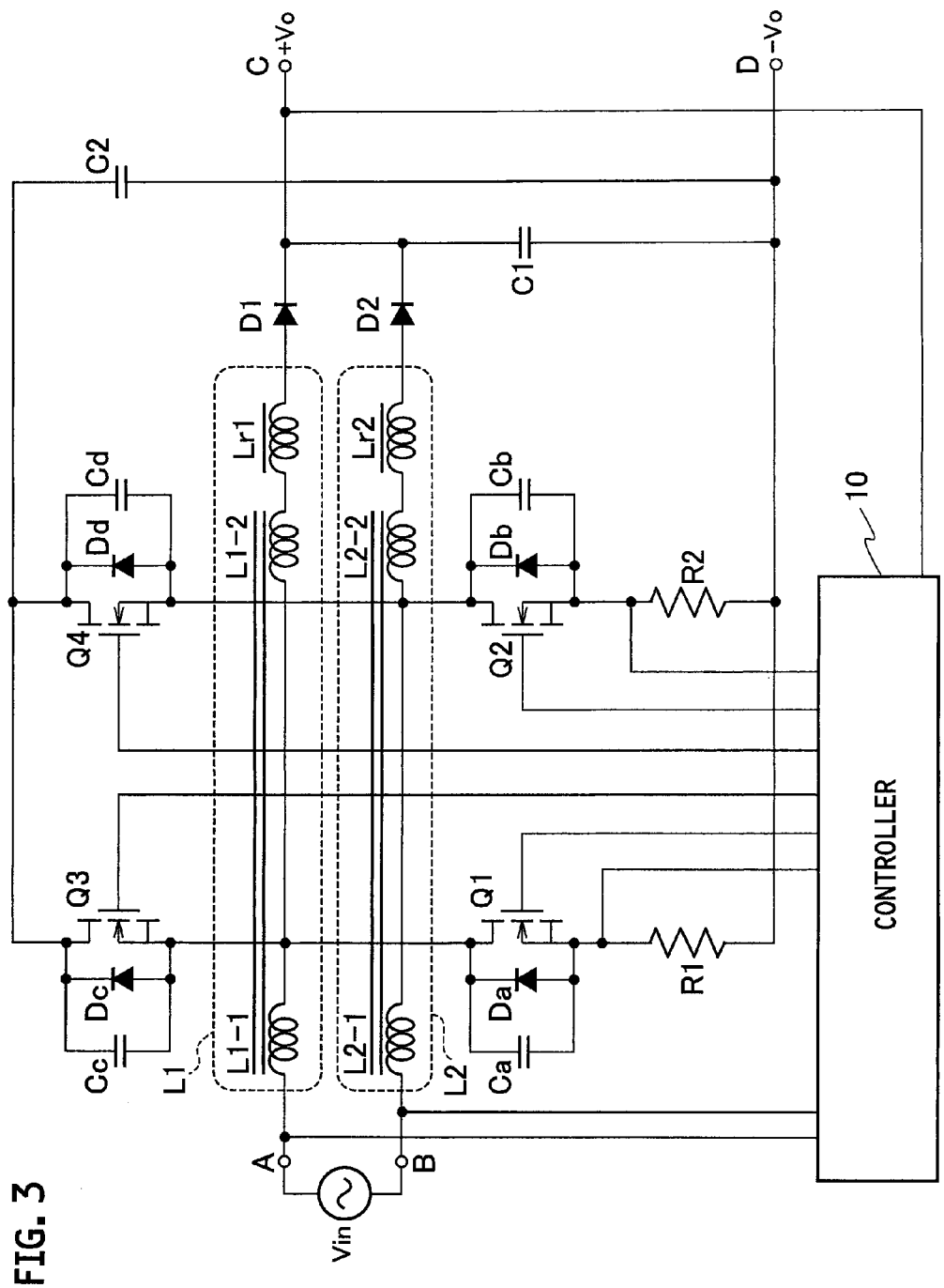
FIG. 3 is a configuration diagram of a bridge-less step-up switching power supply device of a variant of Embodiment 1 of the present invention.

FIG. 3 is a configuration diagram of a switching power supply device of a variant of Embodiment 1 of the present invention. In the switching power supply device of Embodiment 1 illustrated in FIG. 2, the other end of the capacitor C2 is connected to the output terminal C, while in the switching power supply device of a variant illustrated in FIG. 3, the other end of the capacitor C2 is connected to the output terminal D. Even if the configuration of such a variant is used, the same effects as the effects of the switching power supply device of Embodiment 1 can be obtained.

Figure 4A:
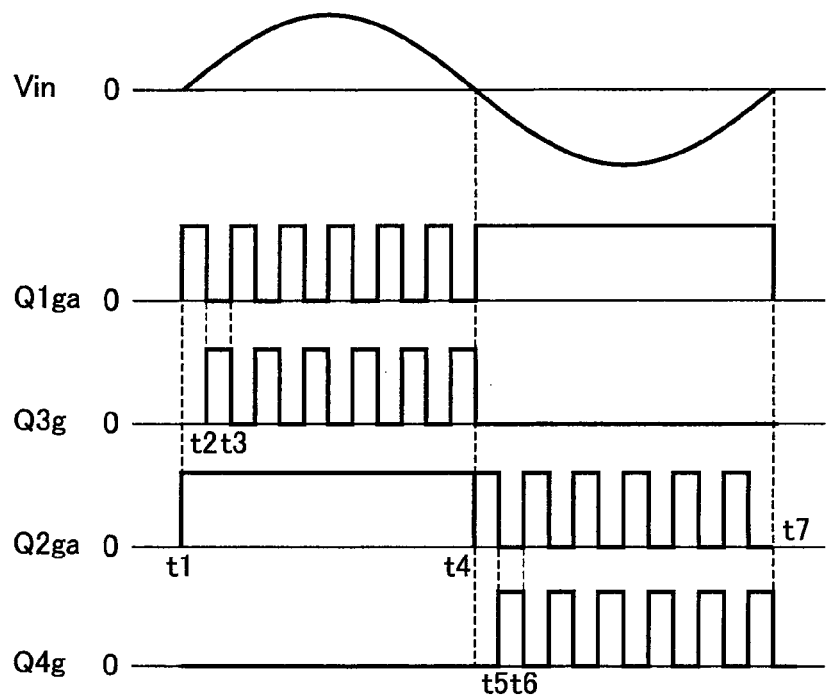
FIG. 4A and FIG. 4B are waveform charts showing each gate signal applied to each switch with respect to a temporal change in an AC voltage of the switching power supply device of Embodiment 1.
Figure 4B:
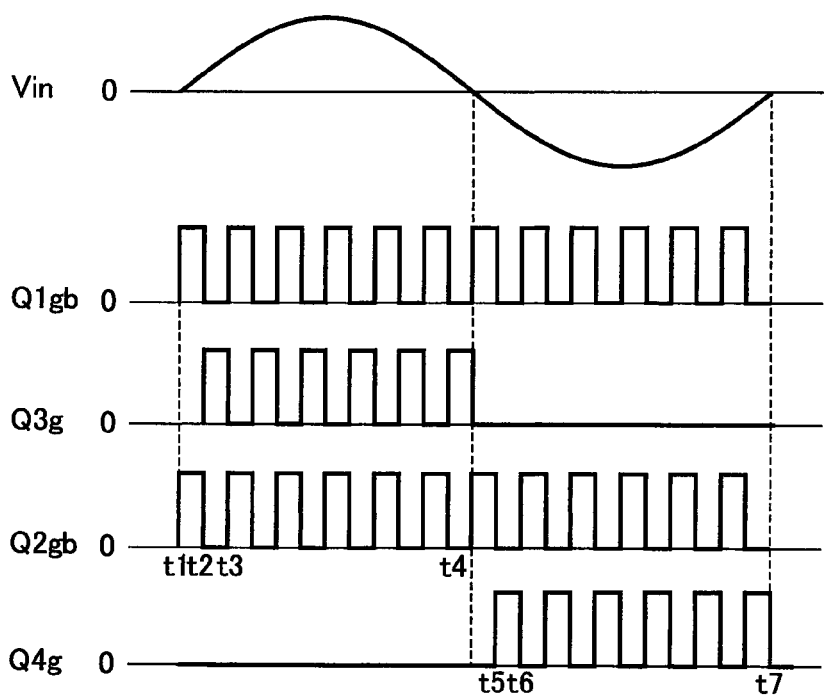

FIGS. 4A and 4B are waveform charts illustrating respective gate signals Q1g to Q4g applied to the respective switches Q1 to Q4 with respect to a temporal change in the AC voltage of the switching power supply device of Embodiment 1 of the present invention.

In FIG. 4A, in a period during which the voltage polarity detected by the input voltage polarity detector is positive, i.e., when the AC voltage of the AC power supply Vin is positive (from time t1 to time t4), the switch Q1 is switched by the gate signal Q1ga and the switch Q2 continues to be turned on by the gate signal Q2ga. The switch Q3 is switched alternately to the switch Q1 and in synchronization with the switch Q1 by the gate signal Q3g, and the switch Q4 continues to be turned off by the gate signal Q4g.

Once the AC voltage alternates (from time t4 to time t7), the switch Q2 is switched by the gate signal Q2ga and the switch Q1 continues to be turned on by the gate signal Q1ga. The switch Q4 is switched alternately to the switch Q2 and in synchronization with the switch Q2 by the gate signal Q4g, and the switch Q3 continues to be turned off by the gate signal Q3g.

In this manner, by performing switching and/or continuous turning-on/off on the switches Q1 to Q4 every time the AC voltage alternates, the operation corresponding to a bridge-less switching power supply device can be performed.

An example illustrated in FIG. 4B simplifies the operation of FIG. 4A. Here, the switches Q1 and Q2 continue to be switched by the gate signals Q1gb and Q2gb, respectively. In this case, the switches Q3 and Q4 are switched between the switching state and the continuously turned-off state every time the AC voltage alternates.

Figure 5:
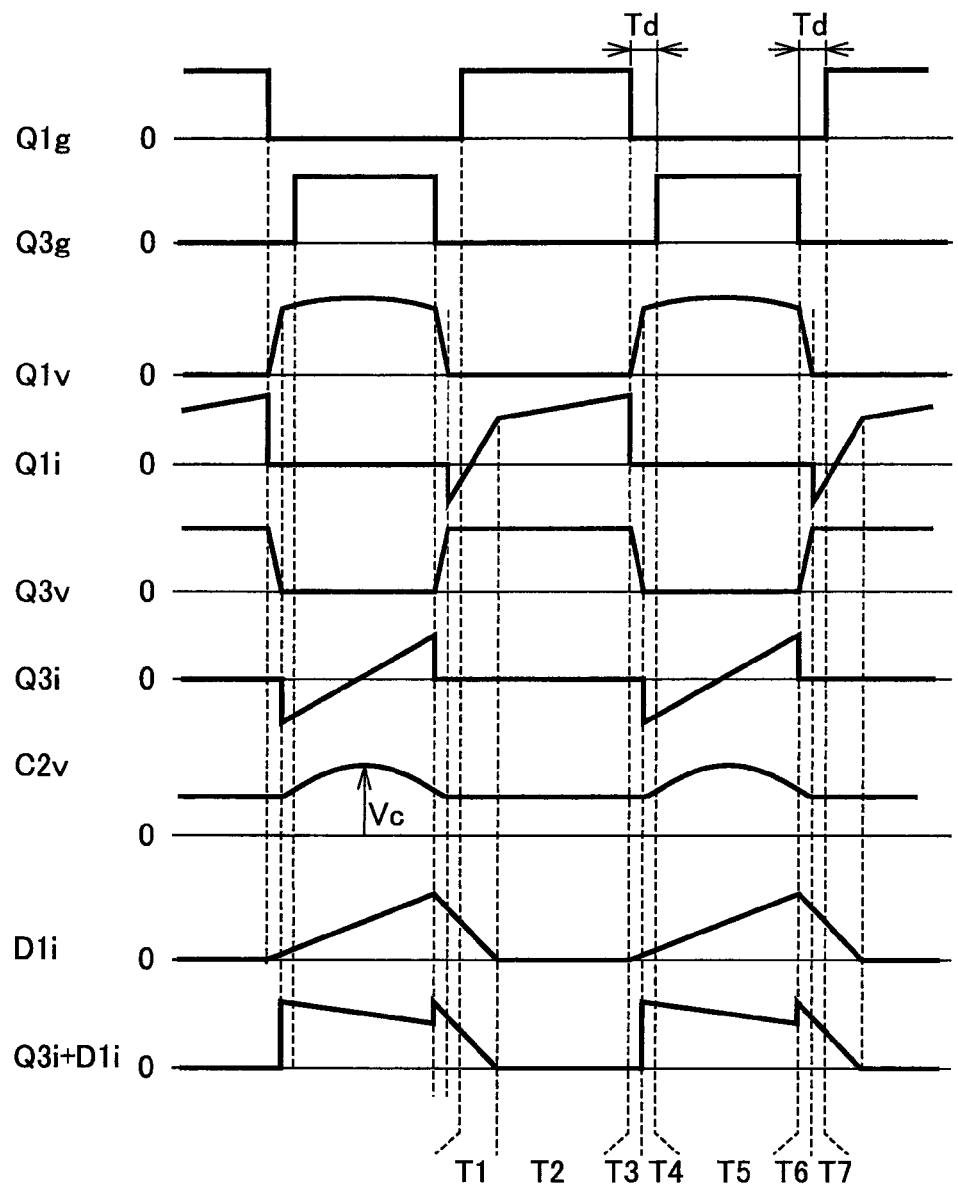
FIG. 5 is a waveform chart showing the operation of each part of the switching power supply device of Embodiment 1.

FIG. 5 is a waveform chart illustrating the operation of each part of the switching power supply device of Embodiment 1 of the present invention.

In FIG. 5, for a voltage C2v of the capacitor C2, a potential to be connected to the drain of the switch Q3 is defined as positive and a potential to be connected to the source of the switch Q1 is defined as 0 volt.

Referring to FIG. 2 to FIG. 6, the operation of each part of the switching power supply device of Embodiment 1 is described. The switch Q1 and the switch Q3 are alternately turned on/off with a predetermined dead time td. Moreover, the switch Q2 and the switch Q4 are alternately turned on/off with the predetermined dead time td.

(Period from t1 to t4 During Which AC Voltage is Positive)

The operation in a period from t1 to t4, during which the AC voltage is positive, is described. As illustrated in FIGS. 4A and 4B, the switch Q1 and the switch Q3 are alternately switched on/off, the switch Q2 continues to be turned on, and the switch Q4 continues to be turned off.

In a period T3 as depicted in FIG. 5, once the switch Q1 is turned off, the capacitor Ca between the drain and source of the switch Q1 is charged through a path extending along L1-1, Q1(Ca), R1, R2, Q2, L2-1, Vin, and L1-1 by an energy of the reactor L1 that is magnetized by a voltage of the AC power supply Vin. Therefore, a voltage Q1v between the drain and source of the switch Q1 rises.

Moreover, at the same time, the energy of the reactor L1 flows also through a path extending along L1-1, Q3(Cc), C2, C1, R2, Q2, L2-1, Vin, and L1-1, and therefore a charge of the capacitor Cc between the drain and source of the switch Q3 is drawn out, and a voltage Q3v between the drain and source of the switch Q3 also starts to fall. A voltage change rate dv/dt of the capacitors Ca and Cc varies with a gradient having a time constant calculated by a sum of the main winding L1-1 and the main winding L2-1, and the capacitors Ca and Cc.

Moreover, at the same time, also in a path extending along L1-1, L1-2, Lr1, D1, C1, R2, Q2, L2-1, Vin, and L1-1, the reactors L1-1 and L1-2 magnetized by the switch Q1 also start to discharge a magnetized energy. At this time, because there is the leakage inductance Lr1, a current D1i passing through the diode D1 slowly rises.

In a period T4, once the charge of the capacitor Cc of the switch Q3 is drawn out, a discharge energy of the main winding L1-1 starts to flow into the diode Dc of the switch Q3. A negative current Q3i illustrated in FIG. 5 and FIG. 6 indicates that a current passes through the diode Dc. In a period during which the negative current Q3i passes, the switch Q3 is turned on by the gate signal Q3g, and whereby zero voltage switching of the switch Q3 can be realized.

Moreover, an energy is supplied to the capacitor C1 through a first path extending along Vin, L1-1, L1-2, Lr1, D1, C1, R2, Q2, L2-1, and Vin and through a second path extending along Vin, L1-1, Q3, C2, C1, R2, Q2, L2-1, and Vin.

In a period T5, the switch Q1 is turned off and the switch Q3 is turned on. At this time, the capacitor C2 is charged via the switch Q3 by the energy of the reactor L1. At the same time, the energy of the auxiliary winding L1-2 starts to be discharged, and the capacitor C2 is discharged through a path of L1-2, Lr1, D1, C2, Q3, and L1-2.

Because the auxiliary winding L1-2 and the leakage inductance Lr1 are connected to the diode D1, the discharge energy of the auxiliary winding L1-2 is output to the capacitor C1 while magnetizing the leakage inductance Lr1. In due time, when a charging voltage C2v of the capacitor C2 starts to rise, then the capacitor C2 will discharge and a current will pass through a path extending along C2, Q3, L1-2, Lr1, D1, and C2. This can be also understood from the fact that the polarity of the current Q3i of the switch Q3 is reversed to positive.

In a period T6, the switch Q3 is turned off by the gate signal Q3g, and at the same time the leakage inductance Lr1 starts to discharge the magnetized energy. A current passes also through a path of Lr1, D1, C2, Q3(Cc), L1-2, and Lr, the capacitor Cc is gradually charged in accordance with a gradient dv/dt having a time constant of the leakage inductance Lr1 and the capacitor Cc, and the voltage Q3v of the capacitor Cc, i.e., the voltage between the drain and source of the switch Q3, rises.

Furthermore, the magnetized energy of the leakage inductance Lr1 starts to discharge through a path extending along Lr1, D1, C1, R1, Q1(Ca), L1-2, and Lr1. At this time, the charge of the capacitor Ca of the switch Q1 is drawn out, and the voltage Q1v of the switch Q1 falls.

In a period T7, a current passes through the same current path as in the period T6, and therefore the discharge energy of the leakage inductance Lr1 flows into the diode Da of the switch Q1. A negative current Q1i illustrated in FIG. 5 and FIG. 6 indicates that a current passes through the diode Da. The switch Q1 is turned on by the gate signal Q1g while the negative current Q1i passes, and thereby the zero voltage switching of the switch Q1 can be realized.

In a period T1, the switch Q1 is turned on, and then a difference current between a magnetizing current passing through the main winding L1-1 caused by the AC power supply Vin and a current passing due to the energy discharge of the leakage inductance Lr1 passes through the switch Q1.

In a period T2, the energy discharge of the leakage inductance Lr1 is complete, and then the current Q1i of the switch Q1 passes in accordance with a gradient of a current that is magnetized by the AC power supply Vin.

Figure 6:
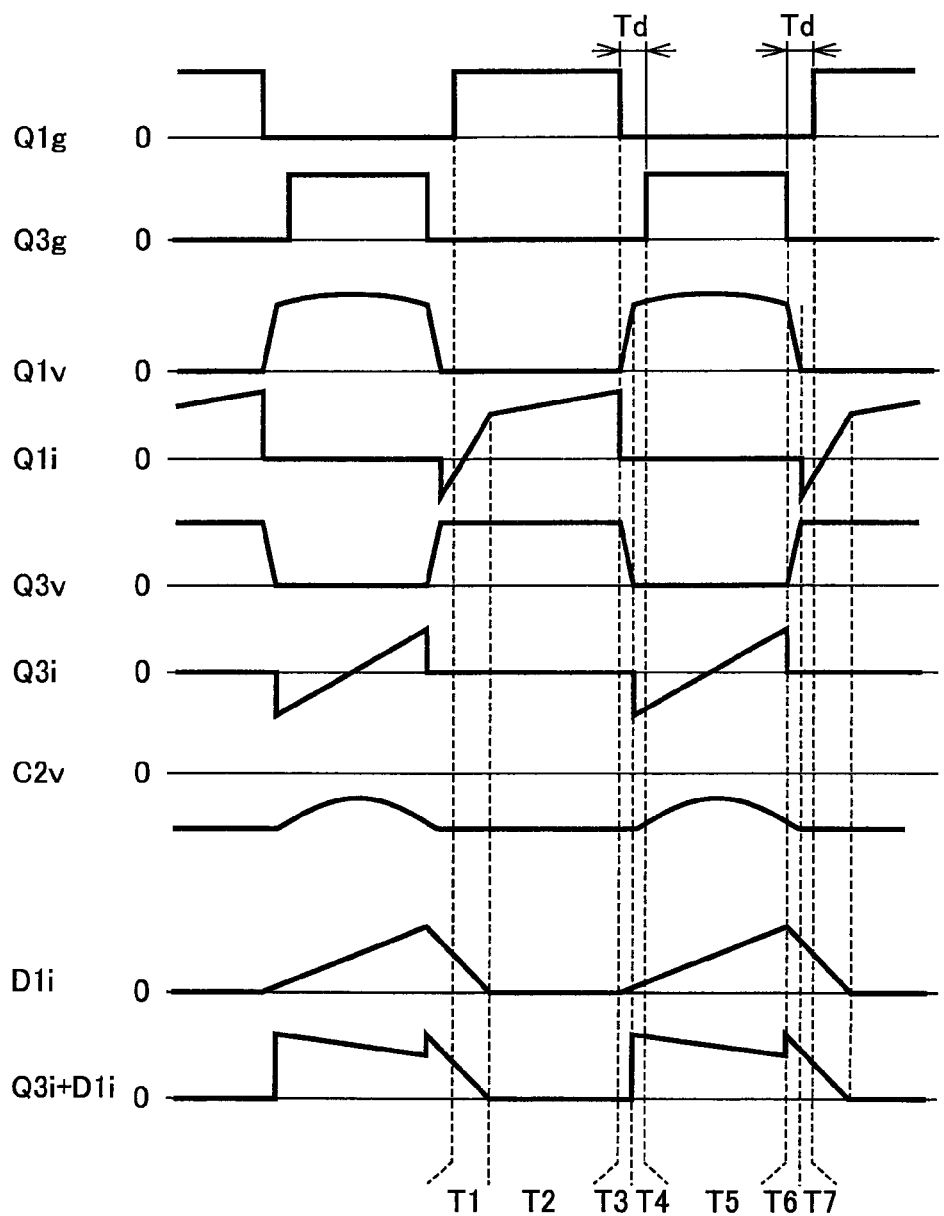
FIG. 6 is a waveform chart showing the operation of each part of the switching power supply device of Embodiment 1.

It is noted that if the number of turns of the auxiliary winding L1-2 is increased, then as illustrated in FIG. 6, the voltage C2v of the capacitor C2 may be negative, and the voltages Q1v, Q3v of the switches Q1, Q3 can be set lower than the output voltage (the voltage of the capacitor C1).

(Period from t4 to t7 During Which AC Voltage is Negative)

The operation in a period from t4 to t7, during which the AC voltage is negative, is described. As illustrated in FIG. 4, the switch Q2 and the switch Q4 are alternately switched on/off, the switch Q1 continues to be turned on, and the switch Q3 continues to be turned off.

Once the switch Q2 is turned off, the capacitor Cb between the drain and source of the switch Q2 is charged through a path extending along L2-1, Q2(Cb), R2, R1, Q1, L1-1, Vin, and L2-1 by an energy of the reactor L2 that is magnetized by a voltage of the AC power supply Vin. Therefore, the voltage Q2v between the drain and source of the switch Q2 rises.

At the same time, the energy of the reactor L2 flows also through a path of L2-1, Q4(Cd), C2, C1, R1, Q1, L1-1, Vin, and L2-1, and therefore a charge of the capacitor Cd between the drain and source of the switch Q4 is drawn out, and a voltage Q4v between the drain and source of the switch Q4 also starts to fall. The voltage change rate dv/dt of the capacitors Cb and Cd varies with a gradient having a time constant calculated by a sum of the main winding L1-1 and the main winding L2-1, and the capacitors Cb and Cd.

Moreover, at the same time, the reactors L2-1 and L2-2 magnetized by the switch Q2 also start to discharge the magnetized energy also through a path of L2-1, L2-2, Lr2, D2, C1, R1, Q1, L1-1, Vin, and L2-1. At this time, because there is the leakage inductance Lr2, a current D2i passing through the diode D2 slowly rises.

Next, once the charge of the capacitor Cd of the switch Q4 is drawn out, a discharge energy of the main winding L2-1 starts to flow through the diode Dd of the switch Q4. The switch Q4 is turned on by the gate signal Q4g while the current passes through the diode Dd, and thereby the zero voltage switching of the switch Q4 can be realized.

Moreover, an energy is discharged to the capacitor C1 through a first path of Vin, L2-1, L2-2, Lr2, D2, C1, R1, Q1, L1-1, and Vin, and through a second path of Vin, L2-1, Q4, C2, C1, R1, Q1, L1-1, and Vin.

When the switch Q2 is turned off and the switch Q4 is turned on, the capacitor C2 is charged via the switch Q4 by the energy of the reactor L2. At the same time, the energy of the auxiliary winding L2-2 starts to be discharged, and the capacitor C2 is discharged through a path of L2-2, Lr2, D2, C2, Q4, and L2-2.

Because the auxiliary winding L2-2 and the leakage inductance Lr2 are connected to the diode D2, the discharge energy of the auxiliary winding L2-2 is outputted to the capacitor C1 while magnetizing the leakage inductance Lr2. In due time, when the charging voltage C2v of the capacitor C2 starts to rise, then the capacitor C2 will discharge and a current will pass through a path of C2, Q4, L2-2, Lr2, D2, and C2. This can be also understood from the fact that the polarity of the current Q4i of the switch Q4 is reversed to positive.

Next, the switch Q4 is turned off by the gate signal Q4g, and at the same time, the leakage inductance Lr2 starts to discharge the magnetized energy. A current passes through the path of Lr2, D2, C2, Q4(Cd), L2-2, and Lr2, the capacitor Cd is gradually charged with the gradient dv/dt having a time constant of the leakage inductance Lr2 and the capacitor Cd, and the voltage of the capacitor Cd, i.e., the voltage Q4v between the drain and source of the switch Q4, rises.

The magnetized energy of the leakage inductance Lr2 starts to discharge through a path of Lr2, D2, C1, R2, Q2(Cb), L2-2, and Lr2. At this time, the charge of the capacitor Cb of the switch Q2 is drawn out, and the voltage Q2v of the switch Q2 falls.

Next, the discharge energy of the leakage inductance Lr2 flows into the diode Db of the switch Q2. The switch Q2 is turned on by the gate signal Q2g while the current passes through the diode Db, and thereby the zero voltage switching of the switch Q2 can be realized.

The switch Q2 is turned on, and then a difference current between a magnetizing current passing through the main winding L2-1 caused by the AC power supply Vin and a current due to the energy discharge of the leakage inductance Lr2 passes through the switch Q2.

The energy discharge of the leakage inductance Lr2 is complete, and then the current Q2i of the switch Q2 passes in accordance with a gradient of a current that is magnetized by the AC power supply Vin.

It is noted that, if the number of turns of the auxiliary windings L1-2 and L2-2 is increased, then as illustrated in FIG. 6, the voltage C2v of the capacitor C2 may be negative, and the voltages Q1v, Q3v (Q2v, Q4v) of the switches Q1, Q3 (Q2, Q4) can be set lower than the output voltage (voltage of the capacitor C1).

In this manner, according to the switching power supply device of the present embodiment, the switch Q1 is turned off, whereby the magnetized energy of the reactor L1 is first discharged from the main winding L1-1 to the capacitor C1 or the load via the switch Q3 and the capacitor C2, and the capacitor C2 is charged, but at the same time, an energy is discharged also from the auxiliary winding L1-2, and the capacitor C2 is discharged through the path of the auxiliary winding L1-2, the leakage inductance Lr1, the diode D1, the capacitor C2, and the switch Q3.

Accordingly, the charging voltage of the capacitor C2 is suppressed low, and the voltage Vds between the drain and source of each of the switches Q1, Q3 will not exceed the respective breakdown voltages. That is, the auxiliary winding L1-2 is provided, whereby the capacitor C2 is actively discharged, and thus an increase of the voltage of the capacitor C2 will not result in exceeding the breakdown voltage of the switching element, and moreover the zero voltage switching of the switches Q1 and Q3 can be realized.

Moreover, the switch Q2 is turned off, whereby the magnetized energy of the reactor L2 is first discharged from the main winding L2-1 to the capacitor C1 or the load via the switch Q4 and the capacitor C2, and the capacitor C2 is charged, but at the same time, an energy is discharged also from the auxiliary winding L2-2, and the capacitor C2 is discharged through the path of the auxiliary winding L2-2, the leakage inductance Lr2, the diode D2, the capacitor C2, and the switch Q4.

Accordingly, the charging voltage of the capacitor C2 is suppressed low and the voltage Vds between the drain and source of each of the switches Q2 and Q4 will not exceed the respective breakdown voltages. That is, the auxiliary winding L2-2 is provided, whereby the capacitor C2 is actively discharged, and thus an increase of the voltage of the capacitor C2 will not result in exceeding the breakdown voltage of the switching element, and moreover the zero voltage switching of the switches Q2 and Q4 can be realized. Accordingly, a switching loss can be reduced and a high-efficient switching power supply device can be provided.

Second Embodiment

Figure 7:
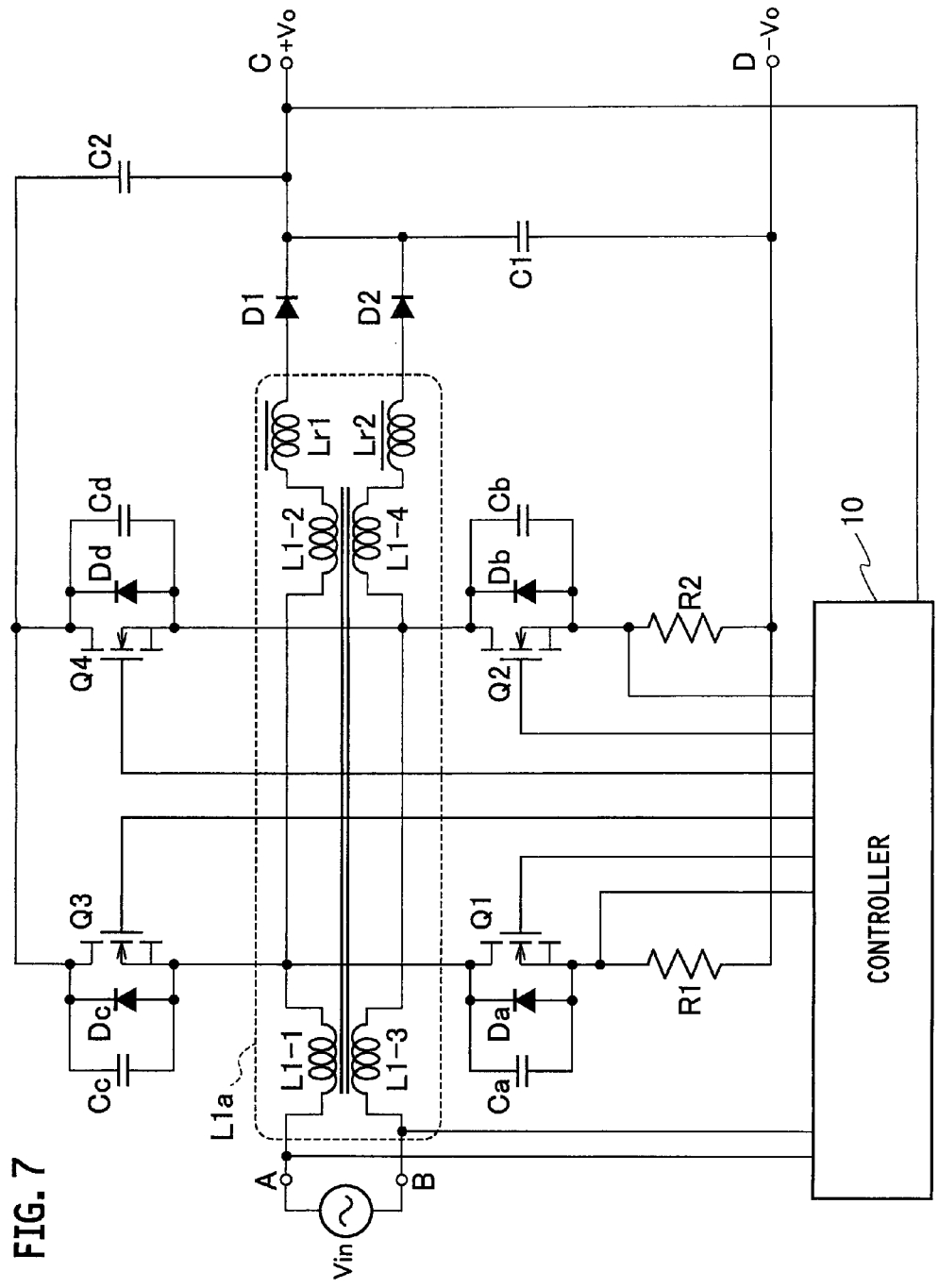
FIG. 7 is a configuration diagram of a bridge-less step-up switching power supply device of Embodiment 2 of the present invention.

FIG. 7 is a configuration diagram of a bridge-less step-up switching power supply device of Embodiment 2 of the present invention. The switching power supply device of Embodiment 2 is characterized in that a reactor L1a made by magnetically coupling the reactor L1 and the reactor L2 illustrated in FIG. 2 is used.

As illustrated in FIG. 7, the reactor L1a is configured by magnetically coupling a reactor including the main winding L1-1 and the auxiliary winding L1-2 having the leakage inductance Lr1 and a reactor including a main winding L1-3 and an auxiliary winding L1-4 having the leakage inductance Lr2.

Such a reactor L1a can simplify implementation because the reactor L1 and the reactor L2 as illustrated in FIG. 2 are integrated into one.

The present invention is not limited to the switching power supply devices of Embodiment 1 and Embodiment 2. In the switching power supply devices of Embodiment 1 and Embodiment 2, the leakage inductance Lr1 (Lr2) generated between the main winding L1-1 and the auxiliary winding L1-2 (L2-1, L2-2) is used, but an external reactor may be used instead of the leakage inductance Lr1 (Lr2).

In this case, the reactor (the first reactor) including the main winding L1-1 and the auxiliary winding L1-2, an external reactor (a third reactor) connected to the auxiliary winding L1-2, the reactor (the second reactor) including the main winding L2-1 and the auxiliary winding L2-2, and an external reactor (a fourth reactor) connected to the auxiliary winding L2-2 can be used.

Moreover, even if such an external reactor is used, the present invention can be also applied to the switching power supply device of Embodiment 2 illustrated in FIG. 7. That is, the first reactor, the second reactor, the third reactor, and the fourth reactor may be magnetically coupled. Thus, implementation can be simplified.

According to the present invention, the first switch is turned off, whereby the magnetized energy of the first reactor is first discharged from the first main winding to the first capacitor or the load via the third switch and the second capacitor, and the second capacitor is charged, but at the same time, an energy is discharged also from the first auxiliary winding, and the second capacitor is discharged through a path of the first auxiliary winding, the first leakage inductance (the third reactor), the first diode, the second capacitor, and the third switch.

Accordingly, the charging voltage of the second capacitor is suppressed low and the voltage Vds between the drain and source of each of the first and third switches will not exceed the respective breakdown voltages. That is, the first auxiliary winding is provided, whereby the second capacitor is actively discharged, and thus an increase of the voltage of the second capacitor will not result in exceeding the breakdown voltage of the switching element, and moreover the zero voltage switching of the first and third switches can be realized.

Moreover, the second switch is turned off, whereby the magnetized energy of the second reactor is first discharged from the second main winding to the first capacitor or the load via the fourth switch and the second capacitor, and the second capacitor is charged, but at the same time, an energy is discharged also from the second auxiliary winding, and the second capacitor is discharged through a path of the second auxiliary winding, the second leakage inductance (the fourth reactor), the second diode, the second capacitor, and the fourth switch.

Accordingly, the charging voltage of the second capacitor is suppressed low and the voltage Vds between the drain and source of each of the second and fourth switches will not exceed the respective breakdown voltages. That is, the second auxiliary winding is provided, whereby the second capacitor is actively discharged, and thus an increase of the voltage of the second capacitor will not result in exceeding the breakdown voltage of the switching element, and moreover the zero voltage switching of the second and fourth switches can be realized. Accordingly, a switching loss can be reduced and a high-efficient switching power supply device can be provided.

INDUSTRIAL APPLICABILITY

The present invention can be applied to power factor improvement circuits and/or AC-DC converters.

This application claims benefit of priority under 35 USC §119 to Japanese Patent Application No. 2012-198058, filed on Sep. 10, 2012, the entire contents of which are incorporated by reference herein.

What is claimed is:

1. A bridge-less step-up switching power supply device comprising:
   a first input terminal and a second input terminal connected to an AC power supply;
   a first output terminal and a second output terminal connected to a load;
   a first reactor including a first main winding connected to the first input terminal and a first auxiliary winding magnetically coupled to the first main winding and connected to the first main winding, the first auxiliary winding having a first leakage inductance;
   a second reactor including a second main winding connected to the second input terminal and a second auxiliary winding magnetically coupled to the second main winding and connected to the second main winding, the second auxiliary winding having a second leakage inductance;
   a first diode connected between the first auxiliary winding of the first reactor and the first output terminal;
   a second diode connected between the second auxiliary winding of the second reactor and the first output terminal;
   a first capacitor connected between the first output terminal and the second output terminal;
   a first switch connected between a connection point of the first main winding and the first auxiliary winding of the first reactor, and the second output terminal;
   a second switch connected between a connection point of the second main winding and the second auxiliary winding of the second reactor, and the second output terminal;
   a third switch connected to the connection point of the first main winding and the first auxiliary winding of the first reactor;
   a fourth switch connected to the connection point of the second main winding and the second auxiliary winding of the second reactor;
   a second capacitor connected between a connection point of the third switch and the fourth switch, and the first output terminal or the second output terminal; and
   a controller controlling turning on/off of the first switch, the second switch, the third switch, and the fourth switch.

2. The bridge-less step-up switching power supply device of claim 1, wherein
   the first reactor and the second reactor are magnetically coupled.

3. A bridge-less step-up switching power supply device comprising:
   a first input terminal and a second input terminal connected to an AC power supply;
   a first output terminal and a second output terminal connected to a load;
   a first reactor including a first main winding connected to the first input terminal and a first auxiliary winding magnetically coupled to the first main winding and connected to the first main winding;
   a second reactor including a second main winding connected to the second input terminal and a second auxiliary winding magnetically coupled to the second main winding and connected to the second main winding;
   a third reactor connected to the first auxiliary winding of the first reactor;
   a fourth reactor connected to the second auxiliary winding of the second reactor;

a first diode connected between the first auxiliary winding of the first reactor and the first output terminal;

a second diode connected between the second auxiliary winding of the second reactor and the first output terminal;

a first capacitor connected between the first output terminal and the second output terminal;

a first switch connected between a connection point of the first main winding and the first auxiliary winding of the first reactor, and the second output terminal;

a second switch connected between a connection point of the second main winding and the second auxiliary winding of the second reactor, and the second output terminal;

a third switch connected to the connection point of the first main winding and the first auxiliary winding of the first reactor;

a fourth switch connected to the connection point of the second main winding and the second auxiliary winding of the second reactor;

a second capacitor connected between a connection point of the third switch and the fourth switch, and the first output terminal or the second output terminal; and a controller controlling turning on/off of the first switch, the second switch, the third switch, and the fourth switch.

4. The bridge-less step-up switching power supply device of claim 3, wherein
the first reactor, the second reactor, the third reactor, and the fourth reactor are magnetically coupled.

5. The bridge-less step-up switching power supply device of claim 1, wherein
the controller includes an input voltage polarity detector detecting a polarity of a voltage between the first input terminal and the second input terminal; and
the controller controls a voltage between the first output terminal and the second output terminal so as to be a predetermined value by turning on/off the first switch to the fourth switch in response to a voltage polarity detected by the input voltage polarity detector.

6. The bridge-less step-up switching power supply device of claim 3, wherein
the controller includes an input voltage polarity detector detecting a polarity of a voltage between the first input terminal and the second input terminal; and
the controller controls a voltage between the first output terminal and the second output terminal so as to be a predetermined value by turning on/off the first switch to the fourth switch in response to a voltage polarity detected by the input voltage polarity detector.

7. The bridge-less step-up switching power supply device of claim 5, wherein
(i) in a period during which the voltage polarity is positive, the controller alternately switches the first switch and the third switch, causes the second switch to continue turning on, and causes the fourth switch to continue turning off; and
(ii) in a period during which the voltage polarity is negative, the controller alternately switches the second switch and the fourth switch, causes the first switch to continue turning on, and causes the third switch to continue turning off.

8. The bridge-less step-up switching power supply device of claim 6, wherein
(i) in a period during which the voltage polarity is positive, the controller alternately switches the first switch and the third switch, causes the second switch to continue turning on, and causes the fourth switch to continue turning off; and
(ii) in a period during which the voltage polarity is negative, the controller alternately switches the second switch and the fourth switch, causes the first switch to continue turning on, and causes the third switch to continue turning off.

* * * * *